Oct. 21, 1952     A. E. BALLARD ET AL     2,614,430

TEMPERATURE INDICATING DEVICE

Filed Feb. 1, 1950                             2 SHEETS—SHEET 1

ALBERT E. BALLARD
CARL W. ZUEHLKE
CHARLES F. H. ALLEN
INVENTORS

BY
ATTORNEYS

Oct. 21, 1952  A. E. BALLARD ET AL  2,614,430
TEMPERATURE INDICATING DEVICE
Filed Feb. 1, 1950  2 SHEETS—SHEET 2

ALBERT E. BALLARD
CARL W. ZUEHLKE
CHARLES F. H. ALLEN
INVENTORS

BY Daniel J. Mayne
Walter O. Hodsdon
ATTORNEYS

Patented Oct. 21, 1952

2,614,430

UNITED STATES PATENT OFFICE 2,614,430

TEMPERATURE INDICATING DEVICE

Albert Edward Ballard, Carl W. Zuehlke, and Charles Francis Hitchcock Allen, Rochester, N. Y., assignors to Eastman Kodak Company, Rochester, N. Y., a corporation of New Jersey Application February 1, 1950, Serial No. 141,754

5 Claims. (Cl. 73—358)

This invention relates to temperature-indicating devices and more particularly to a device suitable, among other uses, for detecting the temperature history of materials such as packaged materials which may have been subjected to variations in temperature during storage, handling, and the like.

The device is especially adapted for use with light-sensitive photographic materials which may lose more or less of their photographic activity if exposed to temperatures above a limiting point. Because of such disadvantageous thermal reaction it is customary to recommend to photographic dealers and storekeepers that sensitive photographic goods such as photographic film packs, and the like, be kept within definite temperature ranges. Heretofore it has been difficult to determine whether a package of photographic film, for example, has been exposed to undesirable temperatures, and consequently, film manufacturers have been put to inconvenience and monetary loss by the need of making replacements of goods whose defects were directly chargeable to the fact that the goods had been exposed to damaging temperatures. Also, it would be desirable for the retailer to know whether or not the sensitive goods being delivered to the customer were of correct quality in this respect.

An object of the present invention is a temperature-indicating device which can be placed in packages, containers, and similar enclosures, for permanently recording the temperature within predetermined ranges, to which such materials have been exposed. Another object of the invention is a temperature-indicating device which can be employed safely in connection with sensitive photographic materials. Other objects will appear hereinafter.

In accordance with the invention, these and other objects are attained by providing a temperature-indicating device in which each of one or more isolated areas of a porous and absorbent but fairly opaque material, such as filter paper, are in contact with a chemical or chemical mixture of a known melting point. As the melting point temperature of one or more of the isolated temperature indicator chemicals is reached, the particular chemical melts and soaks into the porous absorbent material and is carried by capillary action of the absorbent material to the opposite side of the material and becomes visible. Therefore, one can see that a temperature corresponding approximately to the melting temperature of that particular temperature indicator chemical has been reached or exceeded. By placing chemicals of progressively different melting points on the isolated areas of the absorbent layer, a permanent history of a temperature range to which the device has been exposed can be obtained. If the chemicals do not have a prominent color, a dye may be suitably associated therewith to further identification. If desired, one or more of the temperature indicator chemicals can be differently colored so that the temperature device is more easily readable. To prevent one melted temperature indicator chemical from flowing lengthwise of the filter paper and staining an adjacent temperature indicator suitable substantially impervious barriers may be positioned on the filter paper between or around the several chemical indicator spots.

To protect the sensitive photographic products or other products with which this temperature-recording device is to be employed from the melting chemicals, it is desirable that the elements thus described be encased in a fairly impervious envelope. If desired, the impervious envelope may be made of transparent sheeting, or it may be made of metal foil, in which case suitable apertures are positioned in the metal foil adjacent the place where the melted indicator chemical stains through the filter paper.

In accordance with another feature of the invention, the temperature indicating chemicals may be mixed with materials which are fluorescent under ultra-violet light, but otherwise would be invisible in daylight. In this case, the temperature indicating device could be attached to the exterior of the package or container and inspected under ultra-violet light prior to sale to determine whether or not the goods in the package have been exposed to destructive temperatures.

The invention will be further understood by reference to the following detailed description and drawings, in which.

Figure 1:
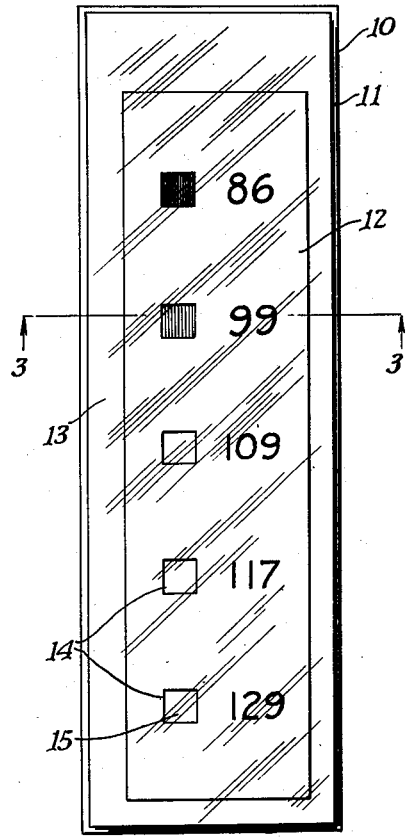
Fig. 1 is a plan view of a form of our novel temperature-indicating device.
Figure 2:
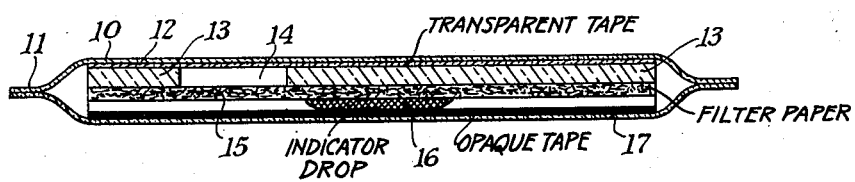
Fig. 2 is an enlarged cross-sectional view of the device taken on lines 3—3 of Fig. 1 showing the relation of the different laminations making up the temperature device.
Figure 4:
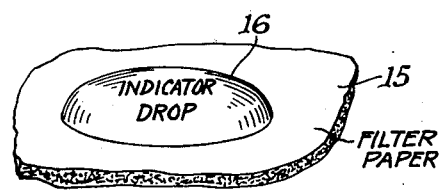
Fig. 4 is a view of a typical drop of indicating chemical before it is melted and penetrates the porous, absorbent layer.

Referring to Fig. 1 there is shown a temperature indicating device 10 composed of an impervious, sealed envelope 11 of transparent material, such as thin cellulose acetate, encasing a laminated assembly comprising a top transparent sheet 12 beneath which is positioned an opaque strip of cellulose acetate 13, having a plurality of windows 14 therein through which a layer of filter paper 15 therebeneath is visible. Temperature numerals 86, 99, 109 117 and 129 corresponding to the melting points of the chemical drops 16 which are positioned adjacent the windows are marked on the strip 13 near the windows. The laminated structure of this temperature recording device is shown more clearly in Fig. 2 and further comprises a plurality of separated chemical drops 16 positioned to the right of windows 14, see also Fig. 3, and on the lower side of the filter paper 15. Beneath the plurality of drops 16 and adjacent the under layer of envelope 11 is a layer of an opaque tape 17. This opaque tape 17 prevents one from viewing the chemicals from the under side of the device and assures that the temperature readings will be made through the windows 14.

Figure 3:
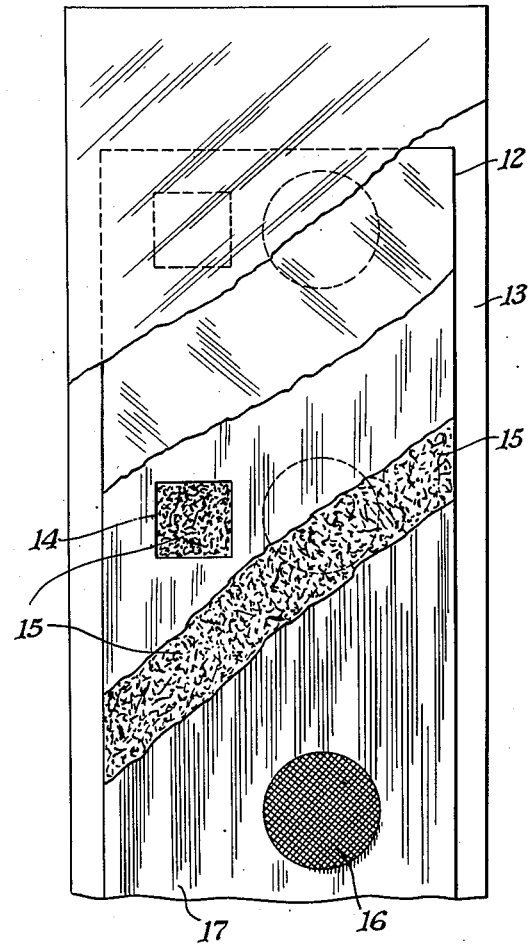
Fig. 3 is a plan view with parts broken away showing the relation of the areas containing the different chemicals to the viewing windows and to the laminations comprising the device.

The offset position of the drops in relation to their adjacent windows is shown more clearly in Fig. 3 in which the strata of the device are indicated by similar reference numerals.

This device may be made in various ways, and one suitable method of making the device is as follows:

A dye is dissolved in a molten, sharp-melting organic chemical compound and a drop of this melt is allowed to fall at the correct position on a piece of cold filter paper. This results in a dome-shaped drop which anchors itself onto the filter paper. Similarly other drops of differently melting chemicals are placed at appropriate places on the filter paper. Or a drop of the melt is allowed to fall on a flexible material, such as a strip of gelatin-coated flexible sheet of cellulose acetate where a similar dome-shaped drop results. This drop is easily removed by bending the flexible sheet and yields a drop with a flattened surface that can be placed in close contact with the filter paper at the desired position adjacent the window bearing the correct temperature reading. Other chemical drops having different melting points can be prepared in this manner and likewise assembled on the filter paper so that they will be placed adjacent the window having the correct temperature marking.

The filter paper and the chemical spots are placed under an opaque strip of cellulose acetate 12 which is provided with a plurality of small windows, the filter paper showing through the opening and the chemical spots being offset from the adjacent openings. This laminated structure is held in place by a strip of the opaque adhesive tape. A multiple pack containing organic-dye mixtures melting at different temperatures is made up in this manner and the whole encased in a heat-sealed cellulose acetate envelope. As is apparent from the foregoing description, the ranges of temperatures to be indicated by the device can vary considerably at the desire of the one making the device.

In the device shown in Fig. 1 the temperatures indicated are determined by the melting points of the following compounds from which the individual indicator drops were formed.

86° F.—Ethyl stearate
99° F.—p-Diethylaminobenzaldehyde
109° F.—Lauric acid
117° F.—Cetyl alcohol
129° F.—Benzalacetophenone Each of these compounds was colored with a compatible red dye which changes the melting point of the pure chemicals somewhat.

As indicated in Fig. 1 that particular temperature device has been exposed to a temperature of at least 99° since chemicals at 86° and 99° have melted and have stained the filter paper beneath their respective windows. Any one of a large number of organic compounds may be employed, depending upon the temperature reading desired. The chemical spots may vary in color one from the other by employing different color dyes. If the presence of the dyes might change the melting point of the chemicals somewhat, each chemical dye mixture may be calibrated to determine the exact melting temperatures, as will be understood by those familiar with such mixtures.

A typical use of the temperature-indicating device would be to place it in the center of a photographic film pack. The purchaser thus could on opening the film pack examine the temperature-indicating device and determine whether or not the film pack had been exposed to damaging temperatures. If it had been he could return the pack to the dealer without having gone through the difficulty of taking pictures with the film and finding out they were all undesirable quality due to the film being damaged by exposure to heat.

The type of temperature-recording device employing a fluorescent chemical which would be visible only in ultra-violet light could be made in a similar way, in which case a particular number of chemicals having different temperatures so as to form a satisfactory range of temperatures would individually be mixed with a fluorescent material instead of the type of dye employed above.

This mixture would be selected with the view that when the chemical melted it would carry the fluorescent material with it through a filter paper and stain the portion of the paper under the adjacent window in the device. Under fluorescent light the stain would be visible adjacent its temperature reading. A great number of fluorescent substances could be employed in this device and probably the most useful would be those which show the most brilliant fluorescence, the color of the whole being a secondary consideration. One could employ for such a fluorescent-forming drop methylcinnamate with anthracene. Other fluorescent materials such as isobenzofurans could be employed. A suitable red colored dye for coloring the melted chemicals is p-nitro-o-chloro-benzene - azo - N - (diβ-hydroxy ethyl) metatoluidene. This dye was employed with the chemicals described above in connection with the temperature device illustrated in the drawings. A great many other dyes known to the art could be employed to color the individual temperature indicating chemicals. While organic chemicals are preferred for the temperature indicating chemicals, inorganic chemicals could also be employed. It will also be understood that transparent sheets made of various resins or cellulose esters can be employed in place of the cellulose acetate sheeting in this embodiment of the invention.

Figure 5:
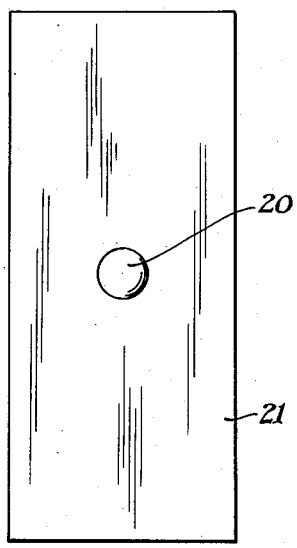
Fig. 5 is a plan view of another form of our invention in which the temperature indicator elements are enclosed in a metal foil envelope having a viewing window therein.
Figure 6:
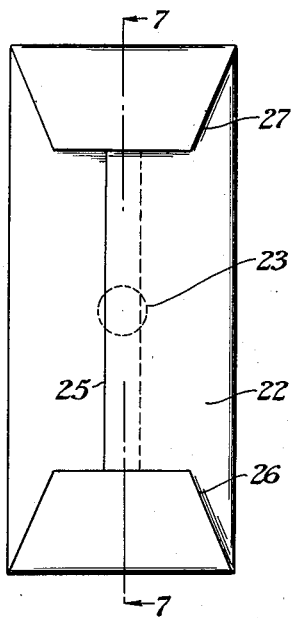
Fig. 6 is the back view of the device shown in Fig. 5.
Figure 7:
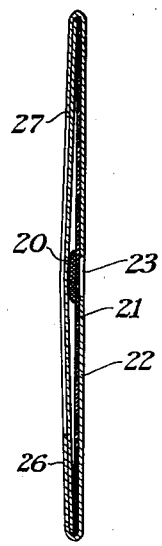
Fig. 7 is a sectional view taken on the lines 7—7 of Fig. 6.

Referring to Figs. 5, 6 and 7, there is shown a different modification of the invention as shown in these figures, a suitably colored chemical compound 20 in droplike form is positioned on a strip of filter paper 21 and enclosed in a metal foil envelope 22. A round window 23 is positioned in the metal foil envelope so that when the chemical melts and penetrates the filter paper, the stain on the opposite side of the filter paper will be visible only through the window. It is evident from Fig. 6 that the foil envelope is overlapped at 25 with flaps 26 and 27 folded over to encompass the chemical contained on the filter paper.

Figure 8:
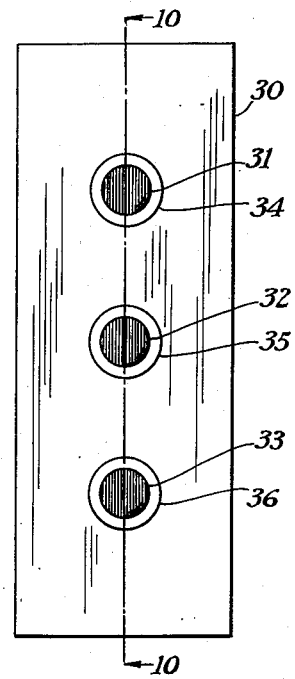
Fig. 8 is a plan view of another form of the absorbent layer having indicator chemical spots thereon which are insulated from one another by circular barriers, such a layer is shown assembled in Fig. 10 with other elements of the device.
Figure 10:
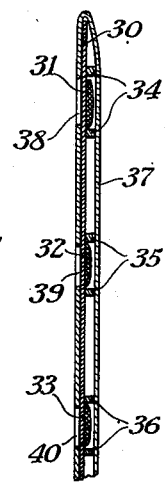
Fig. 10 is a side sectional view taken on the lines 10—10 of Fig. 8.

Referring to Figs. 8 and 10, a filter paper 30 having a plurality of separated chemical indicator drops 31, 32 and 33 fixed thereon is shown. A feature of this modification of the invention is the provision of a barrier ring around each chemical drop which tends to prevent travel of one melted drop to an adjacent drop area. The filter paper 30 is also enclosed, see Fig. 10, in a metal foil envelope 37 having windows 38, 39 and 40 therein placed adjacent the position of the chemical drops 31, 32 and 33.

Figure 9:
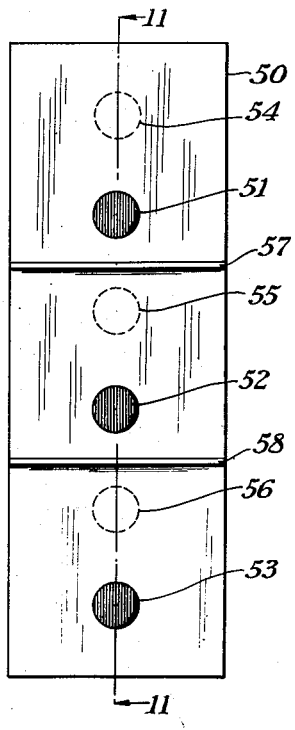
Fig. 9 is a plan view of still another form of the absorbent layer in which pairs of temperature indicating chemical spots are shown separated by straight barriers.
Figure 11:
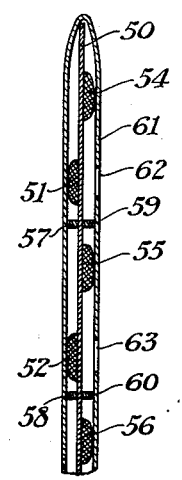
Fig. 11 is a side sectional view taken on the lines 11—11 of Fig. 9.

Referring to Figs. 9 and 11, another interesting modification of the invention is shown. As shown in Fig. 9 a filter paper 50 has a plurality of chemical drops 51, 52 and 53 on the upper side thereof and other chemical drops 54, 55 and 56 on the under side thereof. Adjacent drops on each surface of the filter paper 50 are separated by barriers 57 and 58, 59 and 60, see also Fig. 11. This filter paper 50 is then enclosed in a metal foil envelope 61, as shown in Fig. 11, the envelope may have a form similar to that shown in Fig. 6, having a plurality of windows 62 and 63 therein. These windows are positioned adjacent the area of the filter paper which is above one of the chemical spots.

As shown clearly in Fig. 11, this assembly provides pairs of spot, for example, 51 and 54, separated from each other by filter paper 30, and longitudinally separated from similar pairs of spots 52 and 55 by barriers 57 and 59. Barriers 58 and 60 separate spots 52 and 55 from spots 53 and 56. The particular feature of this modification of the invention is that spots 51, 52 and 53 are made of substantially pure chemical compounds having definite melting points each varying substantially from the other. Spots 54, 55 and 56 are made of compounds which are dyes and which will flow only when the compounds in respective spots 51, 52 and 53 melt and flow into them. This results in straining the melted compound with dye which is then visible through the adjacent window. As above explained, the desired range of temperatures is measured by a proper selection of chemical compounds having suitable variance in melting points. In this modification of the invention the dye compounds should not melt before the adjacent temperature indicator compound. Colorless compounds could be employed in this modification as the temperature indicating elements. Suitable legends, as shown in Fig. 1 could be placed upon the metal foil envelopes to indicate the temperature at which the indicator color became visible through each window. Various high melting point resins or sodium silicate could be employed for forming barriers in these devices.

What we claim and desire to secure by Letters Patent of the United States is:

1. A temperature-indicating device comprising a porous, absorbent material, a plurality of isolated areas thereof contacting a chemical compound, the chemical compound on each of said areas having a different melting point, to provide a range of known melting point temperatures, a metal foil envelope enclosing said absorbent material and chemical compounds and having a plurality of apertures therein, the apertured portions being adjacent to the areas of the absorbent material contacting the chemical compounds but engaging the opposite side thereof, each of said chemicals when melted being adapted to penetrate the absorbent layer and to become visible through an adjacent aperture, thereby indicating if the device has been exposed to a temperature equal to the melting temperature of at least one of the chemical compounds.

2. A temperature-indicating device comprising a porous absorbent material, a plurality of isolated areas thereof contacting a chemical compound, the chemical compound on each of said areas having a different melting point, to provide a progressive range of known melting point temperatures, a metal foil envelope enclosing said absorbent material and chemical compounds and having a plurality of apertures therein, the apertured portions being adjacent to the areas of the absorbent material contacting the chemical compounds but engaging the opposite side thereof, each of said chemicals when melted being adapted to penetrate the absorbent material and to become visible through an adjacent aperture, thereby indicating if the device has been exposed to a temperature equal to the melting temperature of at least one of the chemical compounds, and barrier means associated with said porous, absorbent material positioned to isolate one chemical compound from other chemical compounds.

3. A temperature-indicating device comprising a porous, absorbent material, a plurality of isolated areas thereof contacting a chemical compound, the chemical compound on each of said areas having a different melting point, to provide a progressive range of known melting point temperatures, a metal foil envelope enclosing said absorbent material and chemical compounds and having a plurality of apertures therein, the apertured portions being adjacent to the areas of the absorbent material contacting the chemical compounds but engaging the opposite side thereof, each of said chemicals when melted being adapted to penetrate the absorbent material and to become visible through an adjacent aperture, thereby indicating if the device has been exposed to a temperature equal to the melting temperature of at least one of the chemical compounds and barrier means encircling each of said chemical compounds to isolate substantially the chemical compounds from each other.

4. A temperature-indicating device comprising a porous, absorbent sheet material, each of a plurality of spaced areas on one side thereof contacting a different chemical compound having a melting point different from other of said compounds, to provide a range of known melting point temperatures, each of a plurality of spaced areas on the other side of said sheet contacting a colored chemical compound, said areas on one side of the sheet material being out of registry with, but adjacent, the areas on the opposite side, a metal foil envelope enclosing said absorbent material and chemical compounds and having a plurality of apertures therein, the apertured portions being adjacent to the areas of the absorbent material contacting the colored chemical compounds but on the opposite side thereof, each of said chemicals of known melting point when melted being adapted to penetrate the absorbent sheet and to wet the adjacent colored chemical which then stains through the sheet and becomes visible through the adjacent aperture, thereby indicating if the device has been exposed to a temperature equal to the melting temperature of at least one of the chemical compounds, and barrier means on said sheet surfaces positioned to isolate coacting pairs of chemical compounds and colored compounds from other coacting pairs.

5. A temperature-indicating device comprising a layer of porous absorbent material, a plurality of isolated areas on one side thereof in intimate contact with a fluorescent chemical composition, the composition of each of said areas having a different melting point to provide a progressive range of known melting point temperatures, a metal foil envelope enclosing said absorbent material and said chemical compositions and having a plurality of apertures therein, the apertured portions being adjacent the areas of the absorbent material contacting the chemical compositions but engaging the opposite side thereof, each chemical composition when melted being adapted to penetrate the layer of absorbent material adjacent thereto and to become separately visible on the opposite side thereof through an adjacent aperture only when exposed to ultra-violet light, thereby indicating if the device has been exposed to at least one temperature of said range of melting point temperatures.

ALBERT EDWARD BALLARD.
CARL W. ZUEHLKE.
CHARLES F. H. ALLEN.

REFERENCES CITED

The following references are of record in the file of this patent:

UNITED STATES PATENTS

| Number | Name | Date |
|---|---|---|
| 2,216,127 | McNaught | Oct. 1, 1940 |
| 2,379,459 | Schreiber et al. | July 3, 1945 |
| 2,490,933 | Tornquist et al. | Dec. 13, 1949 |

FOREIGN PATENTS

| Number | Country | Date |
|---|---|---|
| 118,178 | Australia | Mar. 22, 1943 |
| 679,797 | France | Apr. 17, 1930 |